(12) United States Patent
Ogawa

(10) Patent No.: US 8,905,106 B2
(45) Date of Patent: Dec. 9, 2014

(54) RUBBER MEMBER JOINING DEVICE

(75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/996,757

(22) PCT Filed: Jan. 11, 2012

(86) PCT No.: PCT/JP2012/050322
§ 371 (c)(1),
(2), (4) Date: Jun. 21, 2013

(87) PCT Pub. No.: WO2012/096275
PCT Pub. Date: Jul. 19, 2012

(65) Prior Publication Data
US 2013/0284378 A1 Oct. 31, 2013

(30) Foreign Application Priority Data

Jan. 12, 2011 (JP) ................. 2011-004295

(51) Int. Cl.
G03D 15/04 (2006.01)
B29C 65/00 (2006.01)
B29D 30/42 (2006.01)
B29C 65/56 (2006.01)
B27F 4/00 (2006.01)
B32B 37/10 (2006.01)

(52) U.S. Cl.
CPC .............. *B29C 65/004* (2013.01); *B29D 30/42* (2013.01); *B29C 66/022* (2013.01); *B29C 66/1142* (2013.01); *B29C 66/1224* (2013.01); *B29C 66/1226* (2013.01); *B29C 66/221* (2013.01); *B29C 66/4322* (2013.01); *B29C 66/49* (2013.01); *B29C 66/71* (2013.01); *B29C 66/73752* (2013.01); *B29C 66/81433* (2013.01); *B29C 66/8324* (2013.01); *B29C 66/8362* (2013.01); *B29C 66/861* (2013.01); *B29C 66/72141* (2013.01); *B29C 66/81469* (2013.01); *B29C 65/56* (2013.01); *B29C 66/81435* (2013.01); *B29C 66/81465* (2013.01); *B27F 4/00* (2013.01); *B32B 37/10* (2013.01); *B29D 2030/427* (2013.01)
USPC ........... 156/507; 156/157; 156/288; 156/289; 156/304.1; 156/304.5; 156/502

(58) Field of Classification Search
None
See application file for complete search history.

(56) References Cited

U.S. PATENT DOCUMENTS 3,549,458 A * 12/1970 Osta .............................. 156/505
3,575,759 A * 4/1971 Pasquinelli ................... 156/159

(Continued)

FOREIGN PATENT DOCUMENTS

EP 0 704 296 A1 4/1996
JP A-56-019742 2/1981

(Continued)

OTHER PUBLICATIONS

International Search Report issued in Application No. PCT/JP2012/050322; Dated Apr. 3, 2012 (With Translation).

*Primary Examiner* — Mark A Osele
*Assistant Examiner* — Nickolas Harm
(74) *Attorney, Agent, or Firm* — Oliff PLC

(57) ABSTRACT

End portions of a sheet-shaped rubber member are manually and firmly joined together. A pair of opening/closing members is arranged to sandwich and move along the end portions. An opening/closing mechanism opens/closes the pair of opening/closing members between an open position and a closed position where the end portions are joined together. A pair of guiding rollers is provided to one opening/closing member and guides each of the end portions to a joining position. A pressing roller is provided to the other opening/closing member and presses each of the end portions onto the guiding roller. A pair of joining rollers is provided to the pair of opening/closing members, respectively, and sandwiches each of the end portions guided by the pair of guiding rollers. The joining rollers roll on each of the opposing end portions and abut and join the end portions to each other.

9 Claims, 6 Drawing Sheets

(56) References Cited

U.S. PATENT DOCUMENTS

| | | | |
|---|---|---|---|
| 3,647,600 A * | 3/1972 | Vischulis et al. | 156/504 |
| 3,814,652 A * | 6/1974 | King | 156/159 |
| 4,478,672 A * | 10/1984 | Precht | 156/421 |
| 4,526,638 A * | 7/1985 | Clements | 156/159 |
| 5,314,568 A * | 5/1994 | Ryan | 156/504 |
| 5,336,346 A * | 8/1994 | Meltzer et al. | 156/73.4 |
| 5,679,207 A * | 10/1997 | Palone et al. | 156/507 |
| 6,951,676 B2 * | 10/2005 | Shaw | 428/40.1 |
| 7,022,205 B2 * | 4/2006 | Ward et al. | 156/304.3 |
| 7,533,844 B2 * | 5/2009 | Mizutani et al. | 242/555.4 |
| 7,820,005 B2 * | 10/2010 | Jensen et al. | 156/295 |
| 2004/0060653 A1 * | 4/2004 | Hebels et al. | 156/304.1 |
| 2007/0259149 A1 * | 11/2007 | Crum | 428/58 |
| 2008/0156443 A1 * | 7/2008 | Schaefer et al. | 156/446 |
| 2008/0196819 A1 * | 8/2008 | Hafner | 156/159 |
| 2010/0212836 A1 * | 8/2010 | Tachibana et al. | 156/414 |

FOREIGN PATENT DOCUMENTS

| | | |
|---|---|---|
| JP | U-61-019111 | 2/1986 |
| JP | A-64-031628 | 2/1989 |
| JP | A-04-226330 | 8/1992 |
| JP | A-07-205610 | 8/1995 |
| JP | A-2001-334434 | 12/2001 |
| JP | A-2010-234614 | 10/2010 |
| JP | A-2010-284827 | 12/2010 |
| JP | A-2011-148189 | 8/2011 |

* cited by examiner

FIG. 6
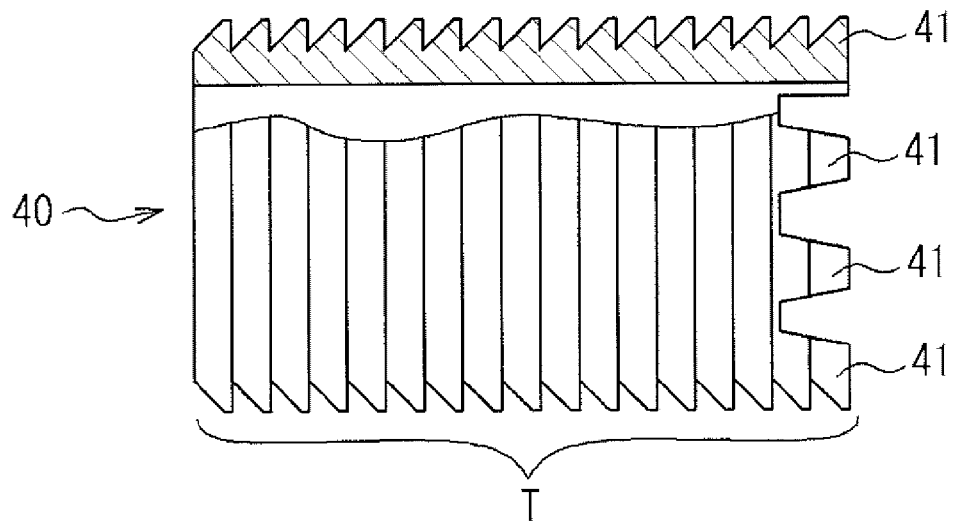
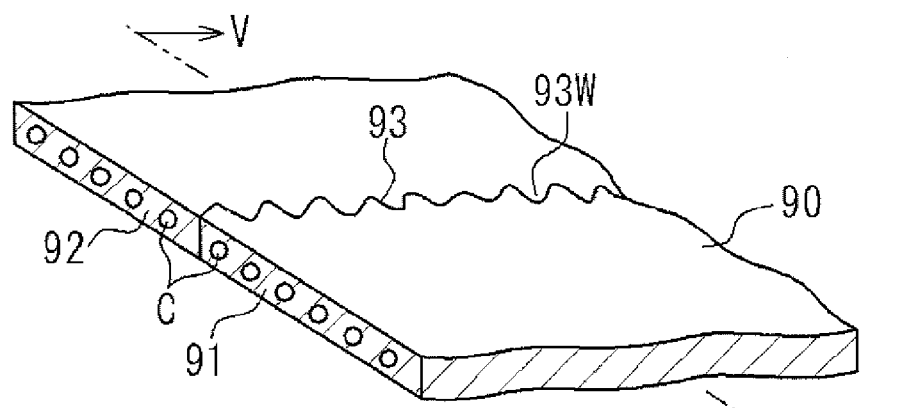
FIG. 7A
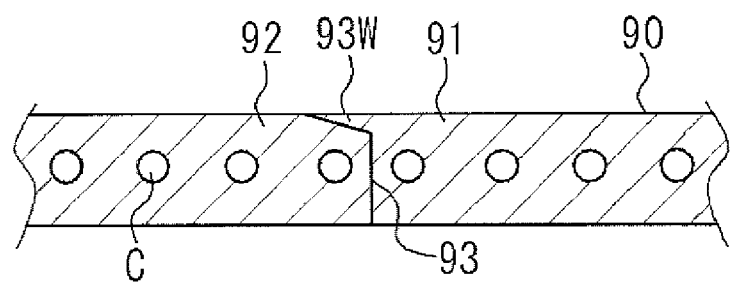
FIG. 7B

RUBBER MEMBER JOINING DEVICE

TECHNICAL FIELD

The present invention relates to a rubber member joining device for abutting end portions of sheet-shaped rubber members to each other to join.

BACKGROUND ART

A tire is manufactured from various types of tire constituent members which are sheet-shaped rubber members. During manufacture of a tire, a carcass ply is wound around a forming drum, for example. After that, a leading end portion and a rear end portion of the carcass ply are abutted to each other and joined together by a joining device so as to form a cylindrical carcass ply. As this kind of joining device, a device for automatically joining end portions of a rubber member together by a pair of joining rollers has been known (See Patent Literature 1).

In the prior-art joining device, the pair of joining rollers is moved along the end portions of the rubber member. The end portions of the rubber member are joined together by the pair of joining rollers. However, with this joining device, since the end portions are joined on one of surfaces of the rubber member, the end portions cannot be joined together from the both surfaces. As a result, there might be a difference in joining strength of the end portions between one surface and the other surface of the rubber member. Therefore, in view of joining of the end portions more firmly, there is a room for improvement. Particularly, in recent years, strength of the rubber member needs to be ensured in response to a trend to light-weighted tires. With this trend, increasing in joining strength of the end portions is in demand.

In addition, with the prior-art joining device, the size of the entire device becomes large and control becomes complicated. Thus, a cost for the device increases. A large space is also needed for installation of the device. In response to time required for the work of the joining device, a cycle time of a joining work becomes longer. There is also a problem that even while the joining device is not in use, since the joining device remains in a tire forming device, space is occupied by the joining device. Moreover, since a lot of labor is required for movement of the joining device, it is difficult to share the joining device in a plurality of tire forming devices. In order to cope with each of the above-described problems, easy and reliable joining of the end portions of the rubber member is in demand.

As the rubber member joining device, a device for joining end portions from both surfaces of a rubber member has been also known (See Patent Literatures 2 and 3).

However, these prior-art joining devices use a large-sized mechanism for moving a joining roller. Thus, the size of the entire device becomes large and control becomes complicated. That is, simple joining of the end portions cannot be realized, and it is difficult to solve the above-described problems.

The end portions can be joined on the both surfaces of the rubber member by using a plurality of joining devices. The plurality of devices are provided on the outside and inside of a forming drum and operate at the same time. However, this type of joining device also becomes large. A large space for installing the device is required. Moreover, a configuration of the forming drum also becomes complicated. As a result, a cost of the joining device becomes high.

CITATION LIST

Patent Literature

PTL 1: Japanese Patent Laid-Open No. 1981-19742
PTL 2: Japanese Patent Laid-Open No. 1989-31628
PTL 3: Japanese Patent Laid-Open No. 1992-226330

SUMMARY OF INVENTION

Technical Problem

The present invention has been made in view of the above-described problems and has an object to manually and firmly join end portions of a sheet-shaped rubber member and to simply and reliably join the rubber member.

Solution to Problem

The present invention is a rubber member joining device provided with a pair of joining rollers rolling on each of opposing end portions of a sheet-shaped rubber member so as to abut the end portions to each other and join them, the rubber member joining device includes: a pair of opening/closing members arranged so as to sandwich the end portions of the rubber member and moving along the end portions, an opening/closing mechanism for opening/closing the pair of opening/closing members between an open position and a closed position where the end portions of the rubber member are joined, a pair of guiding rollers provided to one of the opening/closing member and guiding each of the end portions of the rubber member to a joining position, and a pressing roller provided to the other of the opening/closing member and pressing each of the end portions of the rubber member to the guiding rollers, in which a pair of joining rollers is provided to each of the pair of opening/closing members and sandwiches each of the end portions of the rubber member guided by the pair of guiding rollers.

Advantageous Effects of Invention

According to the present invention, the end portions of the sheet-shaped rubber member can be manually and firmly joined. Moreover, the rubber member can be simply and reliably joined.

BRIEF DESCRIPTION OF DRAWINGS

FIG. 6 is a plan view of one of the joining rollers.
FIG. 7 includes diagrams illustrating a joined portion of tire constituent member after joining.

DESCRIPTION OF EMBODIMENTS

An embodiment of a rubber member joining device (hereinafter referred to as a joining device) of the present invention will be described by referring to the attached drawings.

The joining device of this embodiment is a manual device. The joining device abuts end portions of a sheet-shaped rubber member formed of rubber and joins them together. By moving the joining device manually, the end portions of the rubber member are joined together. As a result, the rubber member in which the end portions are joined together (joined rubber member) is manufactured.

The rubber member to be joined is a member made only of unvulcanized rubber or a member made of unvulcanized rubber and other members. The rubber member is formed of rubber into a sheet-shaped. By cutting the rubber member, the rubber member having a predetermined shape is formed. The joining device abuts the end portions of the rubber member and joins them together. End portions of one sheet of rubber member or a plurality of sheets of rubber members is abutted to each other. By bringing the end portions of the rubber member into pressure contact, the end portions are joined together. If the rubber member is a tire constituent member, a carcass ply or a belt, for example, is joined by the joining device. The carcass ply and the belt are made of unvulcanized rubber and a cord. Hereinafter, a carcass ply which is a tire constituent member will be explained as an example of the rubber member. This carcass ply is used in a radial ply tire (PSR) for an automobile. The tire constituent member (carcass ply) is wound around an outer periphery of a forming drum in a forming process of an unvulcanized tire. By joining both end portions (leading and rear end portions) of the tire constituent member, the tire constituent member is formed into a cylindrical shape.

Figure 1:
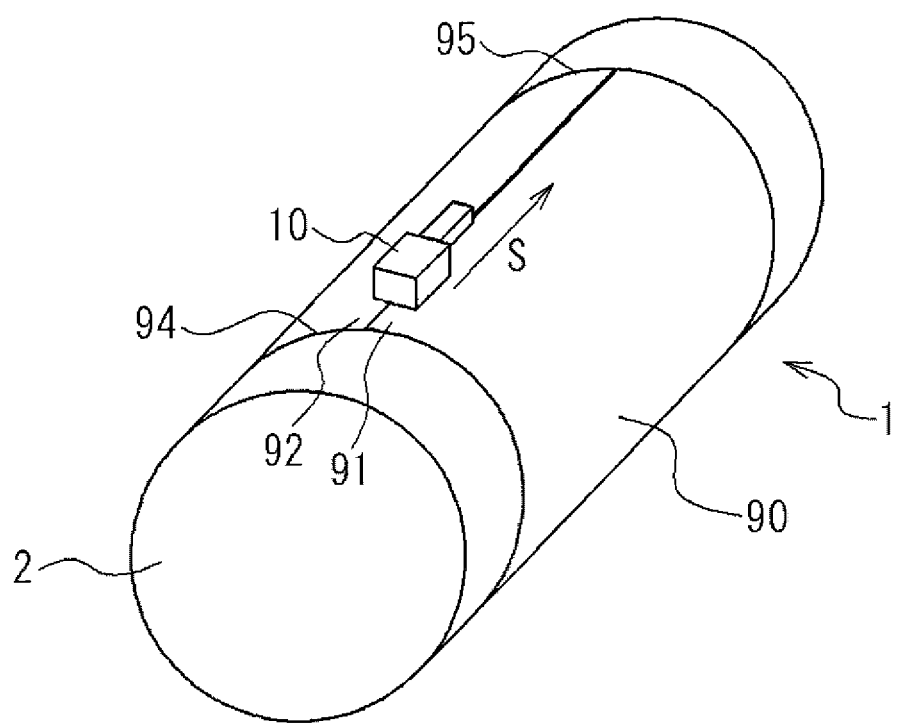
FIG. 1 is a perspective view illustrating a tire forming device.

FIG. 1 is a perspective view illustrating a tire forming device for forming an unvulcanized tire.

A tire forming device 1 is provided with, as illustrated, a cylindrical forming drum 2 and a joining device 10 for joining a tire constituent member 90. The joining device 10 is used in the tire forming device 1. The joining device 10 abuts end portions 91 and 92 of the tire constituent member 90 and joins them together. By joining the tire constituent member 90 on the forming drum 2, an unvulcanized tire is formed.

The forming drum 2 is arranged in a state with a shaft center laid horizontally. The forming drum 2 rotates around the shaft center. An outer periphery of the forming drum 2 expands and contracts by a bladder or the like. The forming drum 2 is a support body supporting the tire constituent member 90 to be joined during forming of the unvulcanized tire. The tire constituent member 90 is wound once around the outer periphery of the forming drum 2. The tire constituent member 90 is formed into a cylindrical shape by the forming drum 2. The cylindrical tire constituent member 90 is held on the outer periphery of the forming drum 2. The forming drum 2 is driven by a driving device (not shown). The driving device rotates the forming drum 2 by a motor. The forming drum 2 rotates the tire constituent member 90. The tire constituent member 90 rotates by an arbitrary rotation angle and stops.

By covering a cord (not shown) with the unvulcanized rubber, the tire constituent member 90 is formed. The tire constituent member 90 has a plurality of cords in rubber on the surface. The tire constituent member 90 is supplied from a supply device (not shown) and is wound around the outer periphery of the forming drum 2. Before the tire constituent member 90 is wound, an inner liner is arranged on the outer periphery of the forming drum 2 in advance. The cord of the tire constituent member 90 is arranged along the shaft center direction of the forming drum 2. The both end portions 91 and 92 of the tire constituent member 90 are arranged without overlapping but opposing each other. The end portions 91 and 92 are arranged so as to be in parallel with each other. A gap with a predetermined interval is provided between the end portions 91 and 92.

The joining device 10 is manually moved along the end portions 91 and 92 of the tire constituent member 90 on the forming drum 2. The end portions 91 and 92 are joined together by the moving joining device 10. At that time, an operator holds the joining device 10 by hand and operates the joining device 10. The operator carries out a joining work of the end portions 91 and 92 by moving the joining device 10.

Figure 2:
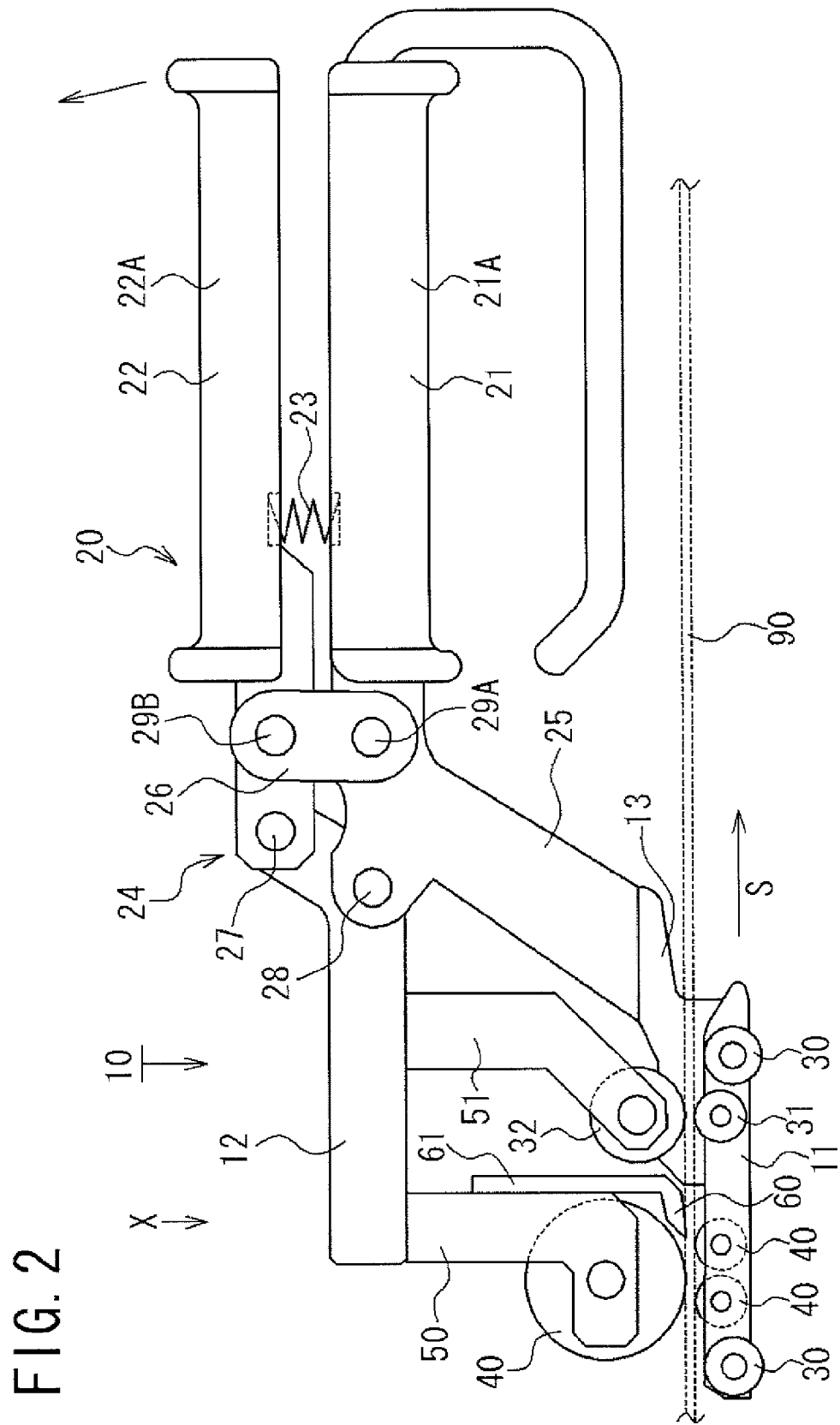
FIG. 2 is a side view illustrating a joining device of an embodiment of the present invention.
Figure 3:
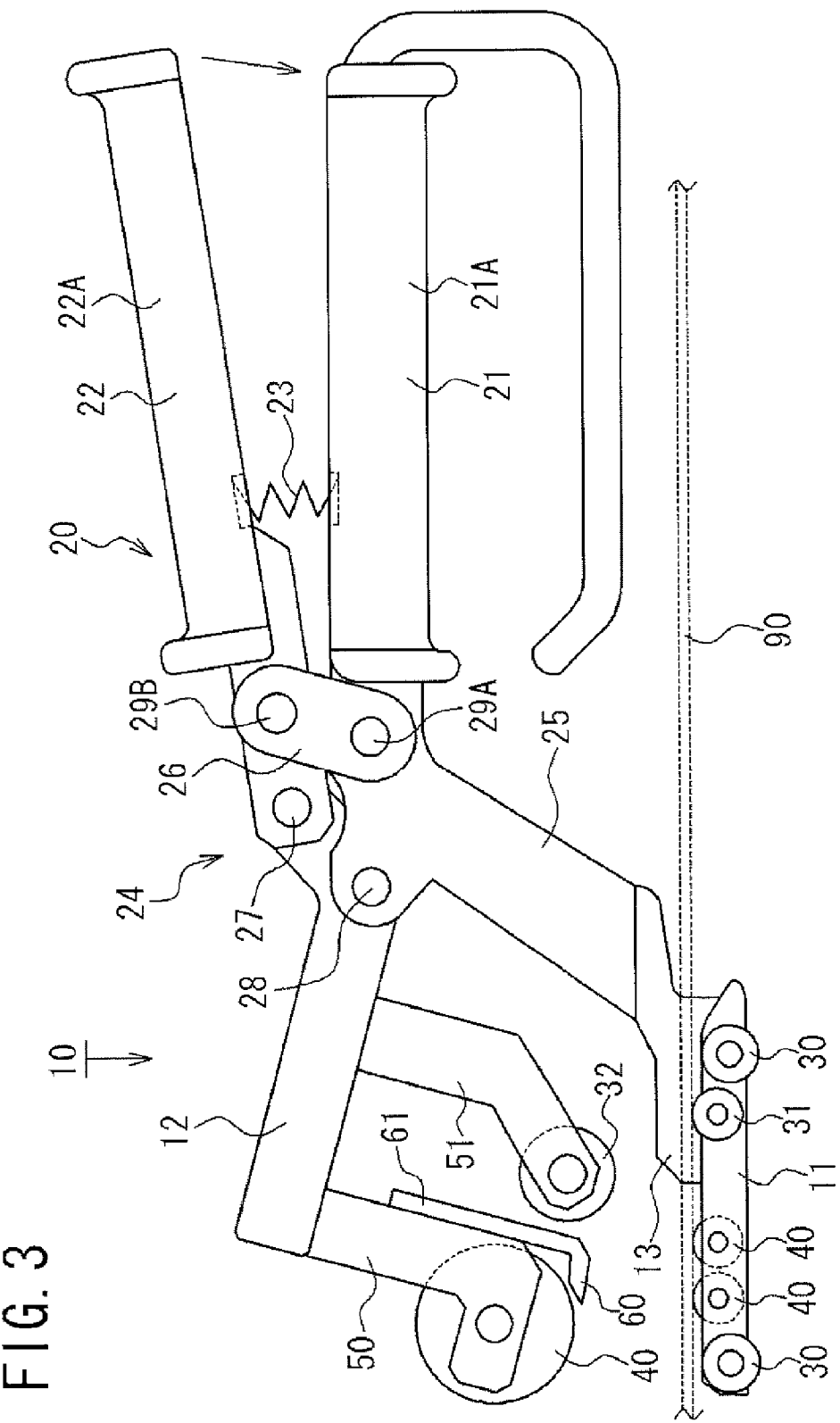
FIG. 3 is a side view illustrating the joining device of this embodiment.

FIGS. 2 and 3 are side views illustrating the joining device 10 of this embodiment. FIG. 2 illustrates the joining device 10 when the tire constituent member 90 is to be joined. FIG. 3 illustrates the joining device 10 when the tire constituent member 90 is not to be joined. In FIGS. 2 and 3, the tire constituent member 90 is indicated by a dotted line.

The joining device 10 is provided with, as illustrated, a pair of opening/closing members 11 and 12, an opening/closing mechanism 20, a plurality of rollers 30, 31, 32, and 40, and a catching-preventing member 60. The opening/closing mechanism 20 opens and closes the pair of opening/closing members 11 and 12. The plurality of rollers 30, 31, 32, and 40 are provided to the opening/closing members 11 and 12. The joining device 10 joins the end portions 91 and 92 of the tire constituent member 90 while moving on the outer periphery of the forming drum 2 by the plurality of rollers 30, 31, 32, and 40. At that time, a pair of joining rollers 40 rolls on each of the opposing end portions 91 and 92 of the sheet-shaped tire constituent member 90. With rolling, the pair of joining rollers 40 abuts the end portions 91 and 92 to each other and joins them together. The catching-preventing member 60 presses the both end portions 91 and 92 and prevents the both end portions 91 and 92 from being caught by the joining roller 40.

The pair of opening/closing members 11 and 12 is formed of a frame on which the rollers 30, 31, 32, and 40 are mounted. The pair of opening/closing members 11 and 12 is openably/closably connected to each other. The rollers 30, 31, 32, and 40 are rotatably supported by the opening/closing members 11 and 12. Here, the pair of opening/closing members 11 and 12 is formed of a lower opening/closing member 11 and an upper opening/closing member 12. The lower opening/closing member 11 is arranged between the forming drum 2 and the tire constituent member 90. The upper opening/closing member 12 is arranged on the outer peripheral side of the tire constituent member 90. The pair of opening/closing members 11 and 12 is arranged so as to sandwich the end portions 91 and 92 of the tire constituent member 90. The pair of opening/closing members 11 and 12 is arranged on both surfaces of the end portions 91 and 92 and manually moved along the end portions 91 and 92.

The pair of opening/closing members 11 and 12 is manually moved between an open position (a position illustrated in FIG. 3) and a closed position (a position illustrated in FIG. 2). As a result, the pair of opening/closing members 11 and 12 is opened/closed. The closed position is a position where the end portions 91 and 92 of the tire constituent member 90 are joined together. At the closed position, the pair of opening/closing members 11 and 12 is brought close to each other. The rollers 31, 32, and 40 sandwich the tire constituent member 90. The open position is a position when the end portions 91 and 92 are arranged between the pair of opening/closing members 11 and 12. At the open position, the pair of opening/closing members 11 and 12 is spaced apart. At the open position, sandwiching of the tire constituent member 90 by the rollers 31, 32, and 40 is released.

The opening/closing mechanism 20 has a pair of operating members 21 and 22, a biasing member 23, and an interlocking mechanism 24. The pair of operating members 21 and 22 is connected to the pair of opening/closing members 11 and 12, respectively. The pair of operating members 21 and 22 is opened and closed by using each one of ends on the opening/closing members 11 and 12 side as a fulcrum. The pair of operating members 21 and 22 is a handle for an operation of opening/closing the pair of opening/closing members 11 and 12. The pair of operating members 21 and 22 is manually operated by an operator and opened/closed. The pair of opening/closing members 11 and 12 is opened/closed in accordance with opening/closing of the pair of operating members 21 and 22. The pair of operating members 21 and 22 has grips 21A and 22A, respectively. The operator grips the grips 21A and 22A so as to open/close the pair of operating members 21 and 22. Moreover, the operator grips the grips 21A and 22A so as to move the joining device 10.

The biasing member 23 is made of an elastic member (spring, rubber or the like) (a coil spring, here). The biasing member 23 is provided between the pair of operating members 21 and 22 and is mounted on the operating members 21 and 22. The biasing member 23 biases the pair of operating members 21 and 22 toward the open position from the closed position. The pair of operating members 21 and 22 is always biased by the biasing member 23 toward the open position (See FIG. 3). When the pair of operating members 21 and 22 is brought close to each other, the biasing member 23 acts a force on the operating members 21 and 22. A force for separating the operating members 21 and 22 from each other acts on the operating members 21 and 22. By means of this force, the pair of operating members 21 and 22 is moved. When the operator grips the grips 21A and 22A, the biasing member 23 contracts. The pair of operating members 21 and 22 is closed. When the operator releases the grips 21A and 22A, the biasing member 23 extends. The pair of operating members 21 and 22 is opened.

The interlocking mechanism 24 opens/closes the pair of opening/closing members 11 and 12 interlocking with opening/closing of the pair of operating members 21 and 22. The interlocking mechanism 24 has a columnar fixing member 25, a plate-shaped movable member 26, and a plurality of rotary shafts 27, 28, 29A and 29B. The lower opening/closing member 11 is fixed to one end of the fixing member 25. One operating member (lower operating member) 21 is fixed to the other end of the fixing member 25. The first rotary shaft 27 rotatably connects an end portion of the other operating member (upper operating member) 22 and an end portion of the upper opening/closing member 12. The upper operating member 22 and the upper opening/closing member 12 are bent around the first rotary shaft 27. The upper opening/closing member 12 is mounted on the second rotary shaft 28 provided to the fixing member 25. The upper opening/closing member 12 rotates around the second rotary shaft 28. As a result, the upper opening/closing member 12 is brought close to the lower opening/closing member 11. Moreover, the upper opening/closing member 12 is spaced apart from the lower opening/closing member 11.

The movable member 26 is mounted on the pair of operating members 21 and 22 by the third rotary shaft 29A and the fourth rotary shaft 29B. The pair of operating members 21 and 22 is connected by the movable member 26. The pair of operating members 21 and 22 is opened/closed by rotating around the rotary shafts 29A and 29B. When the pair of operating members 21 and 22 is opened/closed, the first rotary shaft 27 is displaced. The upper opening/closing member 12 rotates around the second rotary shaft 28 in accordance with the displacement of the first rotary shaft 27. As described above, when the pair of operating members 21 and 22 is operated, the interlocking mechanism 24 opens/closes the pair of opening/closing members 11 and 12.

When the pair of operating members 21 and 22 is opened/closed, the position of the upper operating member 22 is changed with respect to the lower operating member 21. The interlocking mechanism 24 changes the position of the upper opening/closing member 12 with respect to the lower opening/closing member 11 interlocking with opening/closing of the pair of operating members 21 and 22. By means of the interlocking mechanism 24, the pair of opening/closing members 11 and 12 is arranged at the open position and the closed position.

The opening/closing mechanism 20 is manually operated. The opening/closing mechanism 20 moves the pair of opening/closing members 11 and 12. The opening/closing mechanism 20 opens/closes the pair of opening/closing members 11 and 12 between the open position and the closed position. The closed position is a position where the end portions 91 and 92 of the tire constituent member 90 are joined. By means of the opening/closing mechanism 20, the pair of opening/closing members 11 and 12 moves to the open positions. The rollers 30, 31, 32, and 40 are spaced apart. In that state, the end portions 91 and 92 of the tire constituent member 90 are inserted between the pair of opening/closing members 11 and 12 (rollers 30, 31, 32, and 40). By means of the opening/closing mechanism 20, the pair of opening/closing members 11 and 12 moves to the closed positions. The rollers 31, 32, and 40 are brought into contact with the tire constituent member 90. The rollers 31, 32, and 40 sandwich the end portions 91 and 92 of the tire constituent member 90. The opening/closing mechanism 20 has a latch function. The opening/closing mechanism 20 fixes the pair of opening/closing members 11 and 12 being the closed positions at predetermined positions.

Subsequently, the pair of opening/closing members 11 and 12 and the rollers 30, 31, 32, and 40 will be described in detail.

Figure 4:
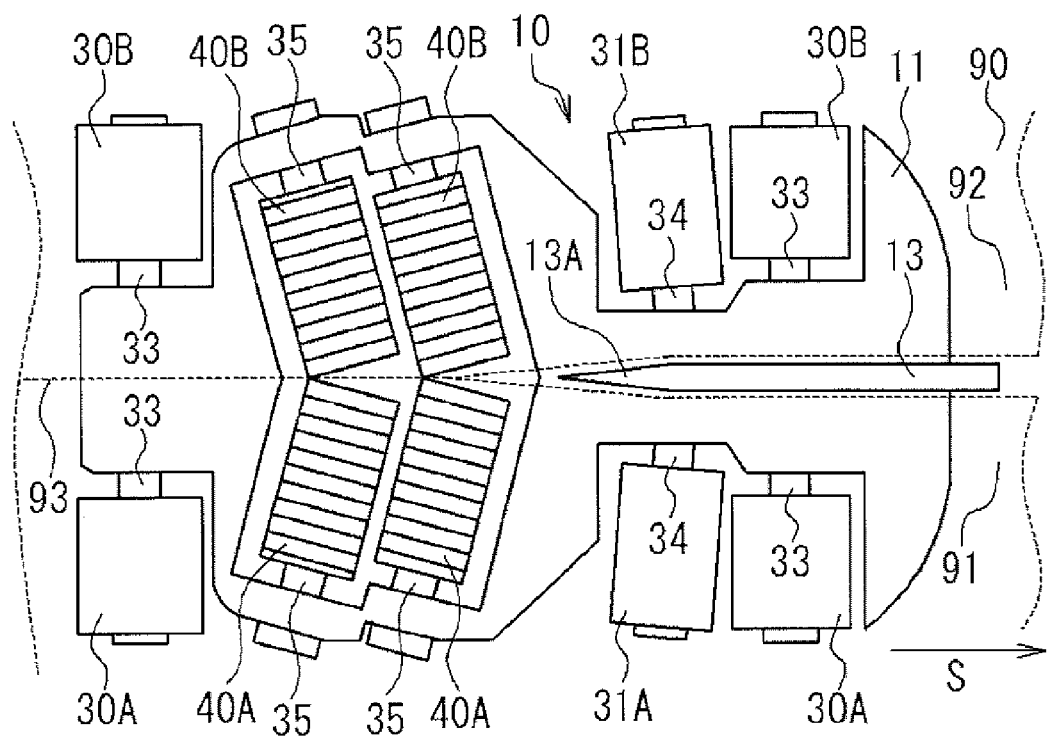
FIG. 4 is a plan view of a lower opening/closing member.

FIG. 4 is a plan view of the lower opening/closing member 11. In FIG. 4, the lower opening/closing member 11 is illustrated with viewing from an arrow X direction in FIG. 2. The tire constituent member 90 in the vicinity of the joining device 10 is indicated by a dotted line.

Between the end portions 91 and 92 of the tire constituent member 90, a gap is provided as illustrated. The joining device 10 moves in a moving direction S (joining direction) along the end portions 91 and 92 and joins the end portions 91 and 92 together. The moving direction S is a direction in which the joining device 10 (pair of opening/closing members 11 and 12) is moved during joining of the end portions 91 and 92. The tire constituent member 90 is joined at a joined portion 93.

The joining device 10 has moving rollers 30 (30A, 30B), guiding rollers 31 (31A, 31B), joining rollers 40 (40A, 40B) and a guide member 13 on the lower opening/closing member 11. The pair of moving rollers 30A and 30B, the pair of guiding rollers 31A and 31B, the two pairs of joining rollers 40A and 40B, and the pair of moving rollers 30A and 30B are arranged in order from the front to the rear in the moving direction S (from right to left in FIG. 4). The rollers 30, 31, and 40 forming pairs are arranged in parallel or with inclination with respect to a direction orthogonal to the moving direction S. The rollers 30, 31, and 40 are opposed to the end portions 91 and 92 of the tire constituent member 90, respectively. The rollers 30, 31, and 40 are rotatably supported by shaft members 33, 34, and 35. The shaft members 33, 34, and 35 are mounted on the lower opening/closing member 11.

During the tire constituent member 90 is to be joined, the plurality of rollers 30, 31, and 40 are arranged between the forming drum 2 and the end portions 91 and 92. The rollers 30, 31, and 40 move integrally with the lower opening/closing member 11. The rollers 30, 31, and 40 roll on the surfaces of the end portions 91 and 92 or the surface of the forming drum 2. At that time, the cylindrical moving rollers 30 are brought into contact with the outer periphery of the forming drum 2. The moving rollers 30 roll on the outer periphery of the forming drum 2. The joining device 10 is moved smoothly by the moving rollers 30 in the moving direction S.

The pair of guiding rollers 31 has a cylindrical shape. The pair of guiding rollers 31 is arranged symmetrically with respect to the center line between the rollers 31. Each of shaft centers of the pair of guiding rollers 31 is inclined from the center line side (inside) to the outside toward the rear side (left side in FIG. 4) of the moving direction S. The pair of guiding rollers 31 rolls on each of the end portions 91 and 92 in a state in contact with the end portions 91 and 92 before joining. A force is applied to the end portions 91 and 92 of the tire constituent member 90 from the rolling guiding rollers 31. The force for bringing the end portions 91 and 92 close to each other is applied to the end portions 91 and 92.

The pair of guiding rollers 31 displaces the end portions 91 and 92. The end portions 91 and 92 are displaced toward the center between the pair of guiding rollers 31. The pair of guiding rollers 31 brings the end portions 91 and 92 close to each other. The pair of guiding rollers 31 draws the end portions 91 and 92 before joining close and guide each of the end portions 91 and 92 to the joining positions. At that time, the end portions 91 and 92 are brought close by a relatively weak force by means of the pair of guiding rollers 31. The pair of guiding rollers 31 positions the end portions 91 and 92 and prepares for joining by guiding the end portions 91 and 92 before joining.

The lower opening/closing member 11 has the guide member 13. The guide member 13 is arranged between the end portions 91 and 92 of the tire constituent member 90 before joining. The both end portions 91 and 92 are guided by the guide member 13. The guide member 13 (See FIG. 3) is fixed between the lower opening/closing member 11 and the fixing member 25. The guide member 13 moves integrally with the lower opening/closing member 11. Moreover, the guide member 13 has a plate shape and is provided on the center line in the width direction (vertical direction in FIG. 4) of the lower opening/closing member 11. The guide member 13 extends linearly from the front to the rear in the moving direction S of the lower opening/closing member 11 and is arranged through between the pair of guiding rollers 31. One end (rear end) of the guide member 13 is located between the adjacent pair of guiding rollers 31 and pair of joining rollers 40. That is, the one end of the guide member 13 is located between the pair of guiding rollers 31 and the pair of joining rollers 40 which is the closest to the pair of guiding rollers 31. Here, the guide member 13 is arranged at a position beyond the pair of guiding rollers 31 and in the vicinity of the pair of joining rollers 40.

The guide member 13 has an inclined portion 13A which gradually becomes thinner. The inclined portion 13A is formed at the rear end in the moving direction S of the guide member 13. The end portions 91 and 92 of the tire constituent member 90 move relatively to the guide member 13 in a state in contact with the side surfaces of the guide member 13. Moreover, the end portions 91 and 92 gradually get closer through displacement along the inclined portion 13A. As a result, the guide member 13 guides the end portions 91 and 92. The guide member 13 is also a positioning member for positioning the both end portions 91 and 92 of the tire constituent member 90. The end portions 91 and 92 are positioned by the guide member 13 before joining and are guided to a predetermined position (joining position). The end portions 91 and 92 move relatively along the guide member 13 while being guided by the pair of guiding rollers 31. After that, the end portions 91 and 92 get closer to the joining rollers 40.

The joining device 10 sequentially joins the end portions 91 and 92 of the tire constituent member 90 together by the joining rollers 40. The joining device 10 has two pairs or more (two pairs, here) of the joining rollers 40 on the lower opening/closing member 11. The two pairs of joining rollers 40 are configured similarly and arranged side by side in the moving direction S. The joining device 10 continuously joins the end portions 91 and 92 by the pairs of joining rollers 40 located at the front and rear of the moving direction S.

Figure 5:
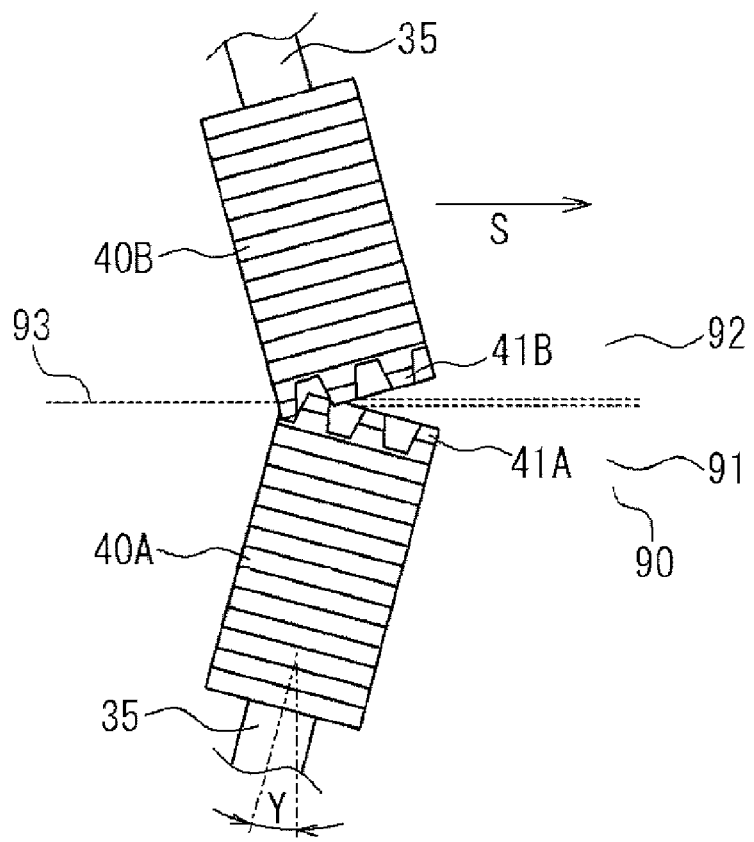
FIG. 5 is a plan view of a pair of joining rollers.

FIG. 5 is a plan view of the pair of joining rollers 40. In FIG. 5, the tire constituent member 90 is indicated by a dotted line in correspondence with FIG. 4.

Each of the pair of joining rollers 40 has a cylindrical shape as illustrated. One ends of the pair of joining rollers 40 are supported by shaft members 35, respectively. The pair of joining rollers 40 is arranged symmetrically with respect to the joined portion 93 (center line between the rollers 40) of the tire constituent member 90. Each of shaft centers of the pair of joining rollers 40 is inclined from the joined portion 93 side (inside) to the outside toward the rear side (left side in FIG. 5) of the moving direction S. An angle Y of the shaft center of the joining roller 40 forms a predetermined angle (an angle of 5 to 30°, for example). The angle Y is an angle formed by the shaft center of the joining roller 40 and a direction orthogonal to the joined portion 93 (moving direction S). The pair of joining rollers 40 is arranged so that an intersection of the shaft centers is located on the joined portion 93.

The pair of joining rollers 40 has a plurality of projections 41 (41A, 41B) projecting in the shaft center directions. The projections 41 are provided to opposing edge portions of the pair of joining rollers 40. The plurality of projections 41 are formed at equal intervals along the edge portions of the joining rollers 40. The same number of projections 41 are provided to the pair of joining rollers 40. On the joined portion 93 sides of the pair of joining rollers 40, the projections 41 and recesses are alternately provided in the circumferential direction. The recess is a portion between the projections 41. The projections 41 and the recesses are provided at the same pitch to the pair of joining rollers 40. In the pair of joining rollers 40, the projections 41 and the recesses are alternately arranged. The projection 41 of one joining roller 40 enters between the projections 41 (recess) of the other joining roller 40. As a result, the projections 41 are meshed with each other. Each of the pair of joining rollers 40 rotates in synchronization at the same speed by the meshed projections 41.

FIG. 6 is a plan view of one of the joining rollers 40. In FIG. 6, a part of the joining roller 40 (upper part in FIG. 6) is illustrated in section.

On an outer periphery of the joining roller 40, as illustrated, protrusions T are formed. The protrusions T are formed annularly or helically. The protrusions T extend in the peripheral direction of the joining roller 40. The protrusions T are arranged on the entire outer periphery of the joining roller 40 (including the projections 41). The plurality of protrusions T are juxtaposed on the outer periphery of the joining roller 40. A sectional shape of the joining roller 40 is formed into a serrated shape on which a plurality of projecting portions are juxtaposed by the protrusions T. The protrusion T is formed into a triangular section. An angle of the side surface of the protrusion T is smaller on the opposite side than on the projection 41 side. The angle of the side surface of the protrusion T is an angle between the side surface of the protrusion T and the shaft center of the joining roller 40. Each of the protrusions T of the joining roller 40 is pressed onto the end portions 91 and 92 of the tire constituent member 90. Predetermined ranges of the end portions 91 and 92 are pressed by the protrusions T of the joining roller 40.

The pair of joining rollers 40A and 40B (See FIG. 5) is pressed onto the end portions 91 and 92 of the tire constituent member 90, respectively, in a state inclined in the opposite directions. The pair of joining rollers 40A and 40B is arranged symmetrically. Moreover, the pair of joining rollers 40A and 40B move in the moving direction S along the end portions 91 and 92. The pair of joining rollers 40A and 40B rolls on the end portions 91 and 92, respectively. With the rolling of the joining rollers 40A and 40B, the end portions 91 and 92 are displaced with the protrusions T of the joining rollers 40A and 40B. At the same time, the end portions 91 and 92 are pressed by the protrusions T. The force for bringing the end portions 91 and 92 close to each other acts on the end portions 91 and 92. As a result, the both end portions 91 and 92 are drawn together. The end portions 91 and 92 are abutted to each other while a gap between the end portions 91 and 92 is eliminated. At the same time, end surfaces of the end portions 91 and 92 are pressed into contact by a pressure applied from the joining rollers 40A and 40B. A force alternately acts on the end portions 91 and 92 from the meshed projections 41A and 41B of the joining rollers 40A and 40B. The surfaces of the end portions 91 and 92 are spliced together by being alternately deformed toward the other portion. As a result, the end portions 91 and 92 are joined together.

FIG. 7 includes diagrams illustrating the joined portion 93 of the tire constituent member 90 after joining. FIG. 7A is a perspective view of the joined portion 93. FIG. 7B is a sectional view taken from arrows of V-V line in FIG. 7A.

The tire constituent member 90 has, as illustrated, a plurality of cords C provided in the rubber. During the end portions 91 and 92 are joined together, surface rubber 93W is stretched alternately by the projections 41A and 41B. The rubber 93W is partially stretched on the surfaces of the end portions 91 and 92. As a result, the end portions 91 and 92 on the surface are alternately overlapped with the surface of the opposing end portion. The joined portion 93 is joined so as to form a wavy shape.

As described above, the pair of joining rollers 40 (See FIG. 4) abuts the end portions 91 and 92 (both end surfaces) to each other and joins them together while drawing the both end portions 91 and 92 together. The joining device 10 joins the same ranges of the end portions 91 and 92 together by the two pairs of joining rollers 40 of the lower opening/closing member 11. As a result, the end portions 91 and 92 are joined firmly. The joining device 10 continuously joins the end portions 91 and 92 together. The tire constituent member 90 is formed cylindrically. At that time, the joining device 10 also joins the end portions 91 and 92 together by the joining rollers 40 of the upper opening/closing member 12 (See FIG. 2).

Figure 8:
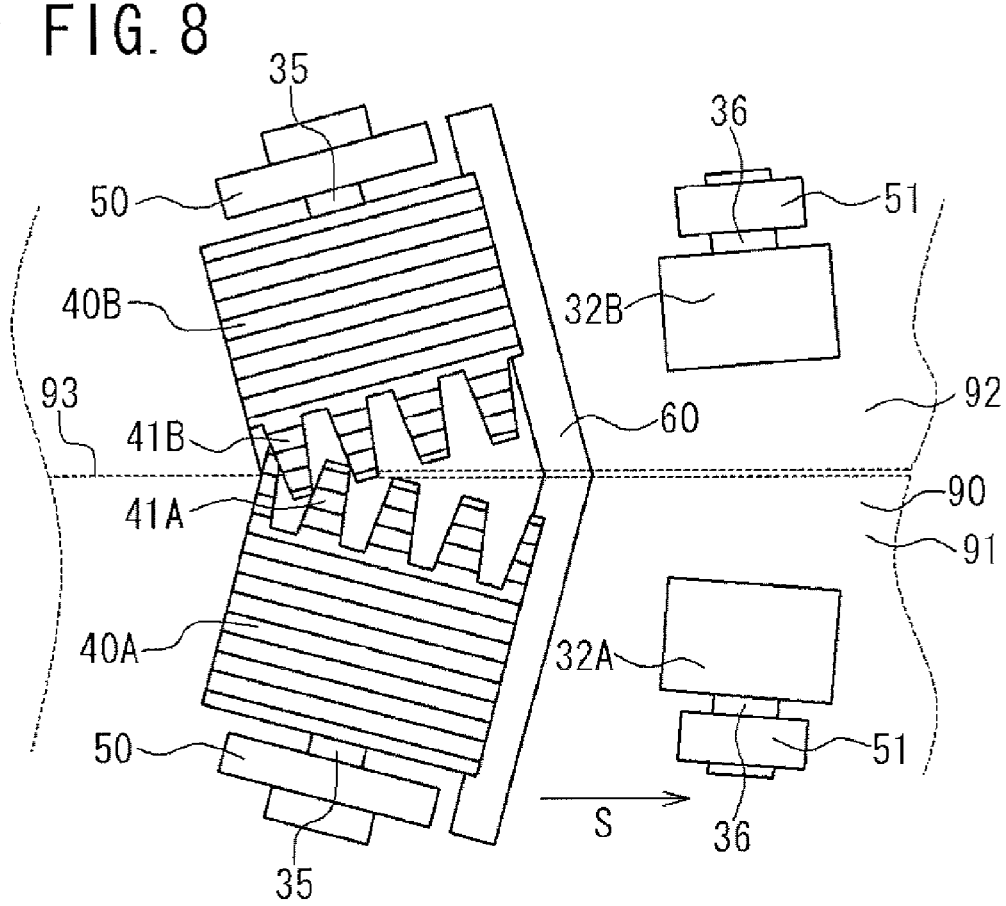
FIG. 8 is a plan view illustrating a roller provided to an upper opening/closing member.

FIG. 8 is a plan view illustrating the rollers 32 and 40 provided to the upper opening/closing member 12. In FIG. 8, the upper opening/closing member 12 and a part of the joining device 10 are omitted. The rollers 32 and 40 are illustrated with viewing from the arrow X direction in FIG. 2. In FIG. 8, the tire constituent member 90 in the vicinity of the joining device 10 is indicated by a dotted line.

The joining device 10 has, as illustrated, the joining rollers 40 (40A, 40B), the pressing rollers 32 (32A, 32B), holders 50 and 51, and the catching-preventing member 60 on the upper opening/closing member 12. The pair of pressing rollers 32A and 32B and the pair of joining rollers 40A and 40D are provided in order from the front to the rear of the moving direction S (from right to left in FIG. 8). The rollers 40 and 32 forming pairs are arranged with inclination with respect to the direction orthogonal to the moving direction S. The rollers 40 and 32 are opposed to the end portions 91 and 92 of the tire constituent member 90, respectively.

The holders 50 and 51 are arranged on both outer sides of the pair of rollers 40 and 32. One ends of the holders 50 and 51 are connected to the upper opening/closing member 12. The holders 50 and 51 are arranged from the upper opening/closing member 12 toward the lower opening/closing member 11. The shaft members 35 and 36 are mounted at the other ends of the holders 50 and 51. The joining rollers 40 and the pressing rollers 32 are rotatably supported by the shaft members 35 and 36, respectively. The holders 50 and 51 hold the rollers 40 and 32. The rollers 40 and 32 move integrally with the upper opening/closing member 12. During the tire constituent member 90 is to be joined, the plurality of rollers 40 and 32 are arranged on the outer peripheries of the end portions 91 and 92 by the holders 50 and 51. In that state, the rollers 40 and 32 roll on the surfaces of the end portions 91 and 92.

Each of the pair of pressing rollers 32 has a cylindrical shape. The pair of pressing rollers 32 is arranged symmetrically to the center line between the rollers 32. Each of shaft centers of the pair of pressing rollers 32 is inclined from the center line side (inside) to the outside toward the rear side (left side in FIG. 8) of the moving direction S. The pair of pressing rollers 32 is arranged in parallel and also opposite to the pair of guiding rollers 31 (See FIG. 2). The pair of pressing rollers 32 rolls on each of the end portions 91 and 92 in a state in contact with the end portions 91 and 92 before joining. At that time, the pressing rollers 32 and the guiding rollers 31 sandwich the end portions 91 and 92 of the tire constituent member 90. The pair of pressing rollers 32 presses the end portions 91 and 92 in contact with the pair of guiding rollers 31. The pair of pressing rollers 32 presses each of the end portions 91 and 92 to the guiding rollers 31. In that state, the guiding rollers 31 guide the end portions 91 and 92 as described above.

The pair of joining rollers 40 is configured similarly to the joining rollers 40 of the lower opening/closing member 11. However, in the joining rollers 40 of the upper opening/closing member 12, a diameter is larger than a diameter of the joining rollers 40 of the lower opening/closing member 11 (See FIG. 2). With regard to the length of the projection 41, that of the joining rollers 40 of the upper opening/closing member 12 is longer than that of the joining rollers 40 of the lower opening/closing member 11. The pair of joining rollers 40 of the upper opening/closing member 12 are arranged between the two pairs of joining rollers 40 of the lower opening/closing member 11. Moreover, the pair of joining rollers 40 of the upper opening/closing member 12 is arranged in parallel and also opposite to the two pairs of joining rollers 40 of the lower opening/closing member 11. Each of the end portions 91 and 92 of the tire constituent member 90 is sandwiched between the one joining roller 40 of the upper opening/closing member 12 and the two joining rollers 40 of the lower opening/closing member 11, respectively.

As described above, the pair of joining rollers 40 is provided to each of the pair of opening/closing members 11 and 12 and arranged opposite to each other. Moreover, the plural pairs of joining rollers 40 sandwich each of the end portions 91 and 92 of the tire constituent member 90 guided by the pair of guiding rollers 31. The joining rollers 40 roll on each of the end portions 91 and 92 in a state sandwiching the both surfaces of each of the end portions 91 and 92. Here, the joining device 10 is provided with the two pairs of joining rollers 40 which contact with one surface of the tire constituent member 90, and the pair of joining rollers 40 which is arranged between the two pairs of joining rollers 40 and contacts with the other surface of the tire constituent member 90. That is, the joining device 10 provides the two pairs of joining rollers 40 and the one pair of joining rollers 40 to the pair of opening/closing members 11 and 12. The joining device 10 abuts the end portions 91 and 92 to each other and joins them together by the plural pairs of joining rollers 40. The end portions 91 and 92 are joined simultaneously from the both surfaces of the tire constituent member 90. At that time, the pair of joining rollers 40 is pressed onto the end portions 91 and 92 by the holders 50.

Figure 9:
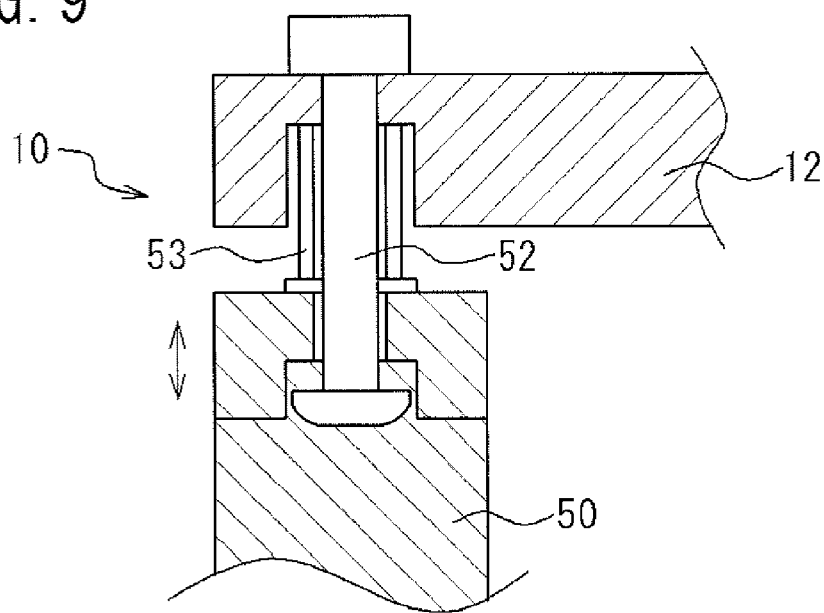
FIG. 9 is a sectional view illustrating a holder and the upper opening/closing member.

FIG. 9 is a sectional view illustrating the holder 50 and the upper opening/closing member 12. In FIG. 9, a part of the holder 50 and a part of the upper opening/closing member 12 illustrated in FIG. 2 are enlarged in illustration.

The joining device 10 has, as illustrated, a columnar connecting member 52 and an elastic member 53 on the upper opening/closing member 12. The connecting member 52 connects the holder 50 to the upper opening/closing member 12. A clearance is provided between the holder 50 and the upper opening/closing member 12. The holder 50 is moved by being guided by the connecting member 52. As a result, the holder 50 is brought close to the upper opening/closing member 12. Moreover, the holder 50 is spaced apart from the upper opening/closing member 12. The connecting member 52 is composed of a bolt and a nut, for example. The bolt is inserted into a through hole provided on the holder 50 and the upper opening/closing member 12. By screwing the nut into the leading end of the bolt, the holder 50 is connected to the upper opening/closing member 12 with variable displacement.

The elastic member 53 is formed of a spring or rubber (a coil spring, here) and is arranged around the connecting member 52. The elastic member 53 is provided between the holder 50 and the upper opening/closing member 12. The elastic member 53 always biases the holder 50. The holder 50 is biased from the upper opening/closing member 12 toward the lower opening/closing member 11. When the end portions 91 and 92 of the tire constituent member 90 are to be joined, the holder 50 is displaced by the joining rollers 40 toward the upper opening/closing member 12. At that time, since the holder 50 is pushed back by the elastic member 53, the joining rollers 40 are pressed onto the end portions 91 and 92. As a result, the end portions 91 and 92 are maintained in a state sandwiched between the joining rollers 40. The end portions 91 and 92 are joined reliably from the both surfaces.

The pair of pressing rollers 32 (See FIG. 2) is pressed onto the end portions 91 and 92 by the holders 51. The holders 51 are also biased by the connecting member and the elastic member (not shown) similarly to the holders 50 of the joining rollers 40. Since the pressing rollers 32 press the end portions 91 and 92 onto the guiding rollers 31, the guiding rollers 31 reliably guide the end portions 91 and 92.

The catching-preventing member 60 (See FIGS. 2, 3, and 8) has a mounting portion 61 (omitted in FIG. 8). The mounting portion 61 is provided to the both ends of the catching-preventing member 60 and mounted on the holder 50. The catching-preventing member 60 is fixed to the holder 50 by the mounting portion 61. The catching-preventing member 60 is provided to the pair of opening/closing members 11 and 12 (the upper opening/closing member 12, here) and moves together with the holder 50 and the pair of joining rollers 40.

When the pair of joining rollers 40 is pressed onto the end portions 91 and 92 of the tire constituent member 90, the catching-preventing member 60 is pressed onto the end portions 91 and 92. The catching-preventing member 60 is arranged at the front of the moving direction S of the pair of joining rollers 40. The catching-preventing member 60 moves together with the pair of joining rollers 40 and presses the end portions 91 and 92 located at the front of the moving direction S of the joining rollers 40. The catching-preventing member 60 prevents the end portions 91 and 92 of the tire constituent member 90 to be joined by the pair of joining rollers 40 from being caught by the pair of joining rollers 40.

The catching-preventing member 60 is arranged along the outer peripheries of the pair of joining rollers 40. In conformity to the outer peripheral shapes of the pair of joining rollers 40, the catching-preventing member 60 is formed into a predetermined shape. The catching-preventing member 60 is formed into a shape bent at the center part (V-shape or U-shape on plan view, for example). The center part of the catching-preventing member 60 is arranged on the center line between the pair of joining rollers 40. The catching-preventing member 60 closes a space between the pair of joining rollers 40. A lower end of the catching-preventing member 60 and lower ends of the pair of joining rollers 40 are located on the same plane.

When the pair of joining rollers 40 joins the end portions 91 and 92 of the tire constituent member 90, the catching-preventing member 60 presses the entire end portions 91 and 92 located at the front of the moving direction S of the pair of joining rollers 40. The catching-preventing member 60 presses the both end portions 91 and 92 in the vicinity of the front of the moving direction S of the pair of joining rollers 40. As a result, the end portions 91 and 92 before joining are prevented from being caught by the rolling pair of joining rollers 40. The catching-preventing member 60 prevents the end portions 91 and 92 from being caught by a portion between the pair of joining rollers 40 or each of the joining rollers 40. At the same time, the end portions 91 and 92 are prevented from being meshed with the projection 41 in the space between the pair of joining rollers 40.

Subsequently, a procedure in which the joining device 10 joins the end portions 91 and 92 of the tire constituent member 90 to each other will be described. Moreover, a procedure for manufacturing the tire constituent member 90 in which the end portions 91 and 92 are joined will be described.

First, the tire constituent member 90 (See FIG. 1) is wound once around the outer periphery of the forming drum 2. The end portions 91 and 92 of the tire constituent member 90 are arranged so as to oppose each other on the outer periphery of the forming drum 2. Subsequently, the end portions 91 and 92 are lifted up on one of edge portions 94 of the tire constituent member 90. The edge portion 94 is a side part of the tire constituent member 90 located outside in the shaft center direction of the forming drum 2. As a result, the end portions 91 and 92 are opened, and the joining device 10 is set on the end portions 91 and 92.

At that time, the pair of operating members 21 and 22 is opened (See FIG. 3). With this movement, the pair of opening/closing members 11 and 12 is opened by the opening/closing mechanism 20 (interlocking mechanism 24). After the lower opening/closing member 11 is brought into contact with the outer periphery of the forming drum 2, the end portions 91 and 92 are lowered between the pair of opening/closing members 11 and 12. Subsequently, the end portions 91 and 92 are arranged on the both sides of the guide member 13 on the edge portion 94 of the tire constituent member 90. The end portions 91 and 92 are arranged in conformity to the side surface of the guide member 13. The end portions 91 and 92 are brought into contact with the side surface of the guide member 13, respectively. Subsequently, by closing the pair of operating members 21 and 22, the pair of opening/closing members 11 and 12 is closed by the opening/closing mechanism 20 (See FIG. 2). As a result, the end portions 91 and 92 are arranged between the pair of opening/closing members 11 and 12. Moreover, the guide member 13 is arranged between the end portions 91 and 92 before joining.

Subsequently, the pair of opening/closing members 11 and 12 is manually moved along the end portions 91 and 92 of the tire constituent member 90. The end portions 91 and 92 are sandwiched between the guiding rollers 31 and the pressing rollers 32. Moreover, the end portions 91 and 92 are sandwiched between the pair of joining rollers 40 of the pair of opening/closing members 11 and 12. With movement of the opening/closing members 11 and 12, the rollers 31, 32, and 40 roll on the end portions 91 and 92. At that time, the pressing rollers 32 press the end portions 91 and 92 onto the pair of guiding rollers 31. The end portions 91 and 92 are guided to the joining position by the joining rollers 40 by the pair of guiding rollers 31 while being guided by the guide member 13. The guided end portions 91 and 92 are abutted to each other and joined by the pair of joining rollers 40 of the pair of opening/closing members 11 and 12. Here, the end portions 91 and 92 are sandwiched between the two pairs of joining rollers 40 and the pair of joining rollers 40. The end portions 91 and 92 are joined to each other at the same time from the both surfaces. Immediately before the pair of joining rollers 40 of the upper opening/closing member 12 joins the end portions 91 and 92, the end portions 91 and 92 are pressed by the catching-preventing member 60.

Subsequently, the joining device 10 (See FIG. 1) is moved toward the other edge portion 95 of the tire constituent member 90. By moving the joining device 10 to a position beyond the edge portion 95, the entire end portions 91 and 92 are joined. After the joining is completed, portions of the end portions 91 and 92 spaced apart from the forming drum 2 are pressed onto the forming drum 2. As a result, the shape of the joined portion 93 is put in order. The tire constituent member 90 is formed cylindrically. After that, the other tire constituent members are arranged to the joined tire constituent member 90. An unvulcanized tire is formed on the forming drum 2. The unvulcanized tire is vulcanized so as to produce a tire.

In the above-described joining device 10, complicated control is not needed for a joining work, but the end portions 91 and 92 of the tire constituent member 90 can be joined manually. Moreover, as compared with a prior-art automatic joining device, the configuration of the joining device 10 becomes simple. Drastic size reduction of the joining device 10 can be realized. As a result, a cost of the joining device 10 is lowered, and also, a space for installing the joining device 10 is not needed. Since time required for work of the joining device 10 is no longer necessary, the joining device 10 can start joining immediately. Thus, cycle time of the joining work can be reduced. When the joining device 10 is not in use, the joining device 10 does not remain on the tire forming device 1. The joining device 10 does not occupy a space, either. Since the joining device 10 can be moved easily, the joining device 10 can be used by a plurality of the tire forming devices 1. By using the joining device 10 as described above, the end portions 91 and 92 can be joined easily.

The end portions 91 and 92 are sandwiched between and joined by the pair of joining rollers 40 provided to each of the pair of opening/closing members 11 and 12. Thus, the end portions 91 and 92 can be joined firmly and reliably from the both surfaces of the tire constituent member 90. Joining strength of the end portions 91 and 92 and strength of the tire constituent member 90 after joining are also improved. By opening/closing the pair of opening/closing members 11 and 12 through the opening/closing mechanism 20, the end portions 91 and 92 can be easily arranged between the pair of opening/closing members 11 and 12. Moreover, the rollers 31, 32, and 40 can be accurately arranged at positions for joining the end portions 91 and 92. With this arrangement, the end portions 91 and 92 can be reliably sandwiched by the rollers 31, 32, and 40. Joining of the end portions 91 and 92 can be also performed accurately.

Since the end portions 91 and 92 are guided to the joining position by the pair of guiding rollers 31, the end portions 91 and 92 can be smoothly joined by the joining rollers 40. Even if the positions of the end portions 91 and 92 before joining are changed, the end portions 91 and 92 can be guided to a predetermined position by the guiding rollers 31. Thus, an influence of arrangement accuracy of the end portions 91 and 92 can be reduced. Moreover, the end portions 91 and 92 can be reliably joined by the joining rollers 40. By pressing the end portions 91 and 92 onto the guiding rollers 31 through the pressing rollers 32, the end portions 91 and 92 can be guided more reliably.

Therefore, according to the joining device 10 of this embodiment, the end portions 91 and 92 of the sheet-shaped tire constituent member 90 can be manually and firmly joined. Moreover, the tire constituent member 90 can be abutted and joined simply and reliably. Since the tire constituent members 90 of various tires can be joined by one joining device 10, versatility of the joining device 10 becomes high.

By guiding the end portions 91 and 92 before joining through the guide member 13, accuracy of the positions of the end portions 91 and 92 can be improved. As a result, the end portions 91 and 92 can be abutted to each other with accuracy. Moreover, the end portions 91 and 92 can be joined accurately. The guide member 13 is preferably arranged through between the pair of guiding rollers 31. In addition, one end of the guide member 13 is preferably located between the guiding rollers 31 and the joining rollers 40. In this case, the end portions 91 and 92 can be accurately guided close to the joining rollers 40 by the guide member 13. Thus, the accuracy of the positions of the end portions 91 and 92 can be further improved.

Since the pair of operating members 21 and 22 for opening/closing the pair of opening/closing members 11 and 12 are provided to the opening/closing mechanism 20, the opening/closing mechanism 20 can be operated easily. Since the pair of opening/closing members 11 and 12 can be easily opened/closed by the pair of operating members 21 and 22, handling of the joining device 10 is also facilitated. Here, the biasing member 23 is provided to the pair of operating members 21 and 22. Moreover, the pair of opening/closing members 11 and 12 is opened/closed interlocking with the opening/closing of the pair of operating members 21 and 22 by the interlocking mechanism 24. Thus, only by opening/closing the pair of operating members 21 and 22, the pair of opening/closing members 11 and 12 can be opened/closed. The opening/closing operation (particularly, the opening operation) of the pair of opening/closing members 11 and 12 is simplified. Workability in joining is also improved.

The joining rollers 40 may be provided one pair each on the pair of opening/closing members 11 and 12. In this case, the end portions 91 and 92 of the tire constituent member 90 are sandwiched between two pairs of joining rollers 40. Even in this way, the end portions 91 and 92 can be firmly joined from the both surfaces of the tire constituent member 90. However, when the two pairs of joining rollers 40 and the pair of joining rollers 40 are arranged to each surface of the tire constituent member 90 as described above, joining strength of the end portions 91 and 92 can be further improved. Contrary to this embodiment, two pairs of joining rollers 40 may be provided to the upper opening/closing member 12 and a pair of joining rollers 40 may be provided to the lower opening/closing member 11. Moreover, two or more pairs of joining rollers 40 may be provided to each of the pair of opening/closing members 11 and 12. Alternatively, a pair of joining rollers 40 may be provided to one of the opening/closing members 11 and 12 and three pairs or more of the joining rollers 40 may be provided to the other of the opening/closing members 11 and 12.

The pair of joining rollers 40 is inclined so that the both outer end portions are located at the rear of the moving direction S with respect to the direction orthogonal to the moving direction S of the pair of opening/closing members 11 and 12 (hereinafter referred to as an orthogonal direction). The outer end portions of the pair of joining rollers 40 are end portions located outside in the orthogonal direction of the pair of joining rollers 40. The pair of joining rollers 40 is inclined so that the portion of the inside in the orthogonal direction is located closer to the front of the moving direction S than the both outer end portions. Similarly to the joining rollers 40, the pair of guiding rollers 31 is inclined so that the both outer end portions are located at the rear of the moving direction S with respect to the orthogonal direction. The outer end portions of the pair of guiding rollers 31 are end portions located at the outside in the orthogonal direction of the pair of guiding rollers 31. The pair of guiding rollers 31 is inclined so that the portion of the inside in the orthogonal direction is located closer to the front of the moving direction S than the both outer end portions. As described above, the pair of joining rollers 40 and the pair of guiding rollers 31 are preferably inclined with respect to the orthogonal direction. At that time, the inclination angle of the pair of joining rollers 40 with respect to the orthogonal direction is preferably set larger than the inclination angle of the pair of guiding rollers 31 with respect to the orthogonal direction.

The guiding rollers 31 may be provided to the upper opening/closing member 12 rather than the lower opening/closing member 11. In this case, the pressing rollers 32 are provided to the lower opening/closing member 11. The guide member 13 may be provided to the upper opening/closing member 12. The guide member 13 of the upper opening/closing member 12 is arranged between the end portions 91 and 92 before joining.

The catching-preventing member 60 may be arranged at the front of the moving direction S with respect to the whole (or any part of) the plural pairs of joining rollers 40. That is, the catching-preventing member 60 may be provided to the lower opening/closing member 11. The catching-preventing member 60 may be provided to the lower opening/closing member 11 and the upper opening/closing member 12. However, the larger the diameter of the joining roller 40 becomes, the higher the concern becomes that the end portions 91 and 92 are caught by the pair of joining rollers 40. It is only necessary that the catching-preventing member 60 is arranged close to the pair of joining rollers 40 in which catching of the end portions 91 and 92 can easily occur. As described above, the diameter of the joining roller 40 of the upper opening/closing member 12 is larger than the diameter of the joining roller 40 of the lower opening/closing member 11. Catching of the end portions 91 and 92 cannot easily occur in the joining roller 40 of the lower opening/closing member 11. Thus, the catching-preventing member 60 is preferably provided to the pair of joining rollers 40 of the upper opening/closing member 12.

In this embodiment, the pair of opening/closing members 11 and 12 is opened/closed by rotating the upper opening/closing member 12 around the second rotary shaft 28. On the other hand, by moving the upper opening/closing member 12 in a state in parallel with the lower opening/closing member 11, for example, a distance between the pair of opening/closing members 11 and 12 may be changed. As described above, the pair of opening/closing members 11 and 12 may be opened/closed by relatively approaching or leaving from each other.

By the joining device 10, the tire constituent member 90 can be joined on a support body other than the forming drum 2. For example, a tire constituent member arranged on a planar shaped support member or a conveyer can be joined by the joining device 10. Moreover, a tire constituent member other than a carcass ply may be joined by the joining device 10.

REFERENCE SIGNS LIST 1 tire forming device
2 forming drum
10 joining device
11, 12 opening/closing member
13 guide member
20 opening/closing mechanism
21, 22 operating member
21A, 22A grip
23 biasing member
24 interlocking mechanism
25 fixing member
26 movable member
27, 28, 29A, 29B rotary shaft
30 moving roller
31 guiding roller
32 pressing roller
33 to 36 shaft member
40 joining roller
41 projection
50, 51 holder
52 connecting member
53 elastic member
60 catching-preventing member
61 mounting portion
90 tire constituent member
91, 92 end portion
93 joined portion
94, 95 edge portion
C cord
T protrusion

The invention claimed is:

1. A rubber member joining device provided with a pair of joining rollers rolling on each of opposing end portions of a sheet-shaped rubber member so as to abut and join the end portions to each other, comprising:
 a first opening/closing member and a second opening/closing member arranged so as to sandwich the end portions of the rubber member and moving along the end portions;
 an opening/closing mechanism for opening/closing the first opening/closing member and the second opening/closing member between an open position and a closed position where the end portions of the rubber member are joined;

a pair of guiding rollers rotatably supported by one of the first opening/closing member or the second opening/closing member and drawing each of the end portions of the rubber member to a joining position; and a pressing roller rotatably supported by the other of the first opening/closing member or the second opening/closing member and pressing each of the end portions of the rubber member to the guiding rollers, wherein a pair of joining rollers is rotatably supported by the first opening/closing member and the second opening/closing member and sandwiches each of the end portions of the rubber member guided by the pair of guiding rollers.

2. The rubber member joining device according to claim 1, further comprising:

two pairs of the joining rollers rotatably supported by either one of the first opening/closing member or the second opening/closing member in contact with one side of a surface of the rubber member; and a pair of joining rollers rotatably supported by the other one of the first opening/closing member or the second opening/closing member arranged between the two pairs of joining rollers and contacting with another side of the surface of the rubber member.

3. The rubber member joining device according to claim 1, wherein the pair of joining rollers and the pair of guiding rollers are arranged on an incline so that outer end portions of the pair of joining rollers and outer end portions of the pair of guiding rollers are positioned rearward of the first opening/closing member and the second opening/closing member in a moving direction with respect to an orthogonal direction to the moving direction.

4. The rubber member joining device according to claim 3, wherein an inclination angle of the pair of joining rollers with respect to the orthogonal direction is larger than an inclination angle of the pair of guiding rollers with respect to the orthogonal direction.

5. The rubber member joining device according to claim 1, wherein the first opening/closing member and the second opening/closing member have a guide member to be positioned between the end portions of the rubber member before being joined and guide both end portions of the rubber members.

6. The rubber member joining device according to claim 5, wherein the guide member is arranged through the pair of guiding rollers; and one end of the guide member is located between the pair of guiding rollers and the pair of joining rollers being adjacent to each other.

7. The rubber member joining device according to claim 1, wherein the opening/closing mechanism has a pair of operating members for opening/closing the first opening/closing member and the second opening/closing member.

8. The rubber member joining device according to claim 7, wherein the opening/closing mechanism has a biasing member for biasing the pair of operating members from a closed position to an open position, and an interlocking mechanism for opening or closing the first opening/closing member and the second opening/closing member and that interlocks the pair of opening/closing members with the pair of operating members.

9. The rubber member joining device according to claim 1, further comprising:

a catching-preventing member mounted on the first opening/closing member and the second opening/closing member and preventing the end portions of the rubber member to be joined by the pair of joining rollers from being caught by the pair of joining rollers.

* * * * *